United States Patent [19]

Morrill

[11] 4,363,465

[45] Dec. 14, 1982

[54] EXTREME TEMPERATURE, HIGH PRESSURE BALANCED, RISING STEM GATE VALVE WITH SUPER PRELOADED, STACKED, SOLID LUBRICATED, METAL-TO-METAL SEAL

[75] Inventor: Charles D. Morrill, Bellaire, Tex.

[73] Assignee: Smith International, Inc., Newport Beach, Calif.

[21] Appl. No.: 697,084

[22] Filed: Jun. 16, 1976

[51] Int. Cl.³ .............................................. F16K 41/04
[52] U.S. Cl. ............................... 251/214; 137/246.12; 251/268; 251/282; 251/327; 251/328; 277/110; 277/125; 277/DIG. 6

[56] References Cited

U.S. PATENT DOCUMENTS

| | | | |
|---|---|---|---|
| Re. 22,459 | 3/1944 | Armington et al. | 277/112 |
| 564,953 | 7/1896 | Armstrong | 277/125 |
| 969,255 | 9/1910 | Dorsey | 277/125 |
| 1,825,962 | 10/1931 | Laird | 277/167.5 |
| 1,971,169 | 8/1934 | Wheeler | 277/125 |
| 2,292,543 | 8/1942 | Patterson | 277/110 |
| 2,417,181 | 3/1947 | Sandilands | 166/14 |
| 2,433,638 | 12/1947 | Volpin | 251/51 |
| 2,644,804 | 7/1953 | Rubin et al. | 277/DIG. 6 |
| 2,750,961 | 6/1956 | Uritis | 137/625.5 |
| 2,948,556 | 8/1960 | Epain et al. | 286/26 |
| 2,992,840 | 7/1961 | Reynolds et al. | 285/332.3 |
| 3,011,804 | 12/1961 | Burns | 285/137 |
| 3,057,596 | 10/1962 | Tobin | 251/214 |
| 3,284,111 | 11/1966 | Pinkard | 285/141 |
| 3,305,015 | 2/1967 | Brown et al. | 166/0.6 |
| 3,331,609 | 7/1967 | Moran | 277/110 |
| 3,429,009 | 1/1970 | Beresnev et al. | 277/125 |
| 3,443,816 | 5/1969 | Saleri et al. | 251/214 |
| 3,463,518 | 8/1969 | Broussard et al. | 285/340 |
| 3,538,938 | 11/1970 | Volpin | 137/246.2 |
| 3,540,533 | 11/1970 | Morrill | 166/315 |
| 3,625,552 | 12/1971 | Mahoff | 285/336 |
| 3,696,831 | 10/1972 | Fowler | 137/246.12 |
| 3,697,089 | 10/1972 | Jacisin et al. | 277/35 |
| 3,741,294 | 6/1973 | Morrill | 166/0.5 |
| 3,829,106 | 8/1974 | Wheelock | 277/205 |
| 3,851,853 | 12/1974 | Teeters | 251/214 |
| 3,954,932 | 5/1976 | Coale | 277/DIG. 6 |
| 4,029,294 | 6/1977 | McCaskill | 251/282 |
| 4,056,272 | 11/1977 | Morrill | 285/140 |
| 4,068,853 | 1/1978 | Schnitzler | 277/DIG. 6 |

FOREIGN PATENT DOCUMENTS

| | | | |
|---|---|---|---|
| 729482 | 3/1966 | Canada | 277/125 |
| 2544352 | 4/1976 | Fed. Rep. of Germany | 251/327 |
| 323305 | 12/1934 | Italy | 277/112 |
| 242687 | 10/1946 | Switzerland | 277/125 |
| 17518 | 10/1894 | United Kingdom . | |
| 367429 | 2/1932 | United Kingdom . | |
| 514661 | 11/1939 | United Kingdom . | |
| 538517 | 8/1941 | United Kingdom . | |
| 763187 | 12/1956 | United Kingdom . | |
| 805550 | 12/1958 | United Kingdom . | |
| 917726 | 2/1963 | United Kingdom . | |
| 944604 | 12/1963 | United Kingdom . | |
| 1299819 | 12/1972 | United Kingdom . | |
| 1344597 | 1/1974 | United Kingdom . | |

*Primary Examiner*—George L. Walton
*Attorney, Agent, or Firm*—Ned L. Conley; Murray Robinson; David Alan Rose

[57] ABSTRACT

A balanced high pressure rising stem gate valve has lubricated metal-to-metal seal means between the bonnet part of the valve body and the valve actuating stem and between the chamber part of the valve body and the balancing stem. Each seal means includes plural, e.g. three dished elastic metal ring gaskets with a high temperature resistant and chemical resistant ring of solid lubricant, tetrafluoroethylene or graphite between each adjacent pair of metal gaskets. Each metal gasket is softer than the stem and is of rectangular cross-section and the edge at the inner periphery on the concave side is rounded. Each seal means is disposed in an annular pocket in the adjacent part of the valve body extending around the stem. Each pocket is closed by an annular plug screwed into the pocket far enough to flatten out the dished metal rings sufficiently for the inner and outer peripheries of each ring to engage the stem and pocket respectively with enough pressure to cause plastic deformation of the inner peripheral edge on the concave side and the outer peripheral edge on the convex side, and to deform the elastic solid lubricant rings into engagement with the stem and pocket, and to prevent movement of the seal relative to the pocket when the valve is in use despite variations in the temperature of the valve and the pressure of the fluid therein and thereabout. The valve stem sealing arrangement may also be employed for packing off lock screws and in other situations wherein relatively movable parts are to be sealed both during and after relative motion.

28 Claims, 17 Drawing Figures

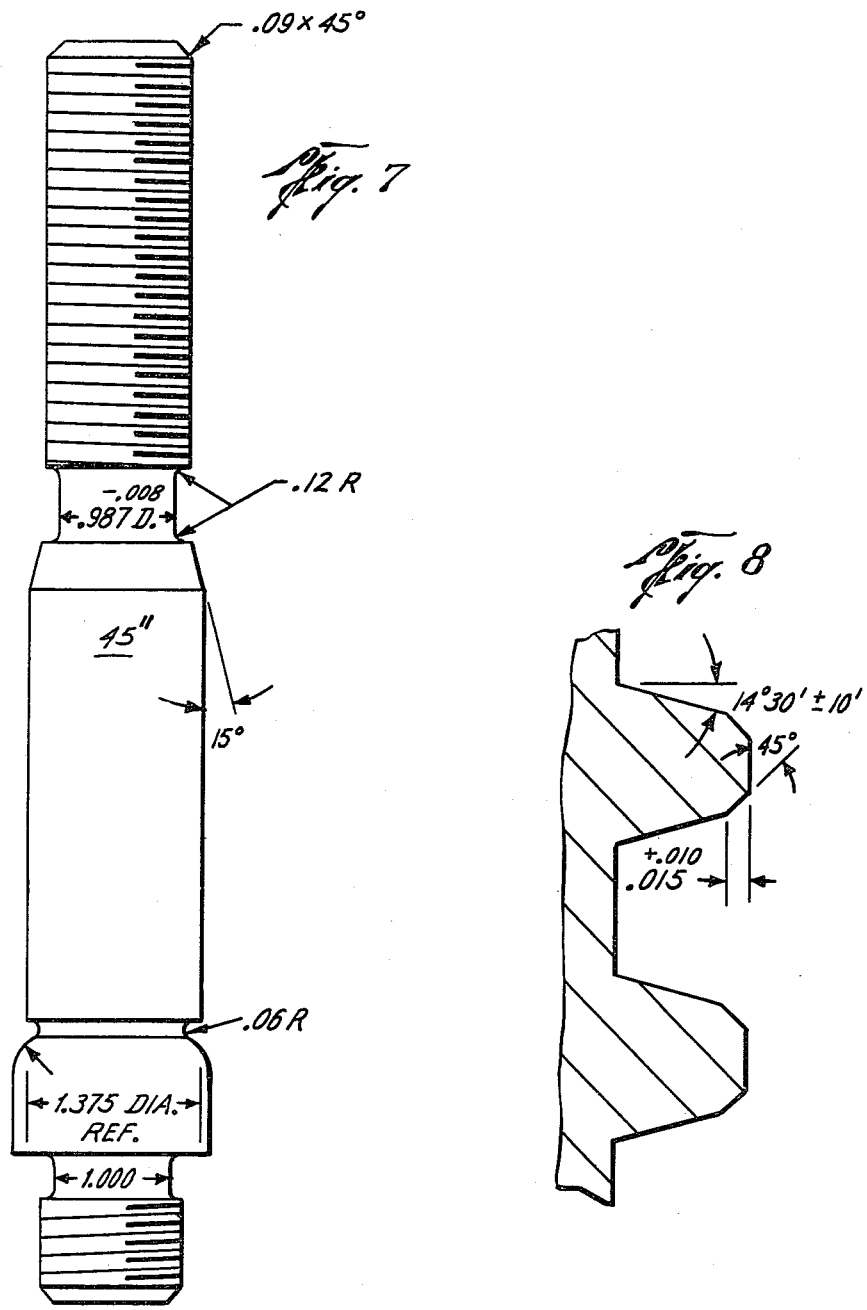

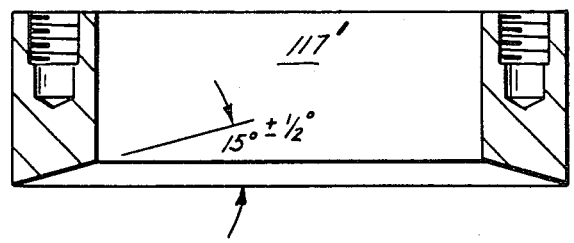
Fig. 11
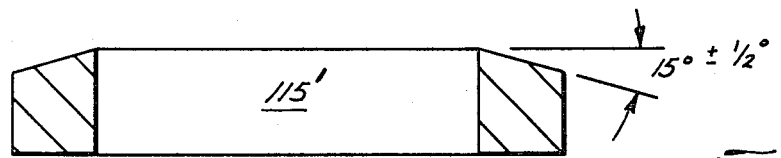
Fig. 12
Fig. 13   Fig. 14
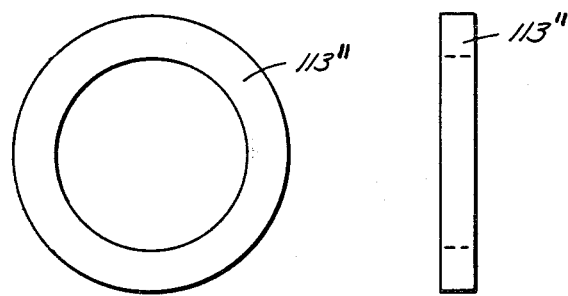

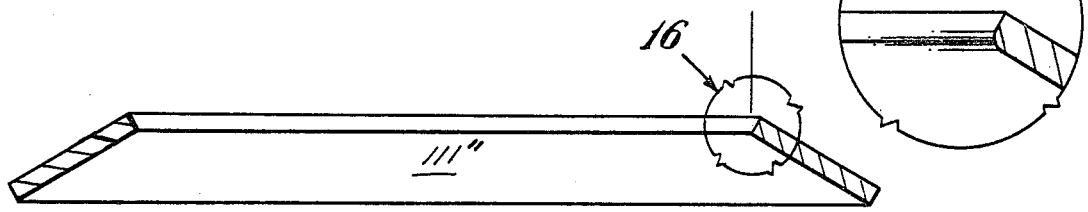
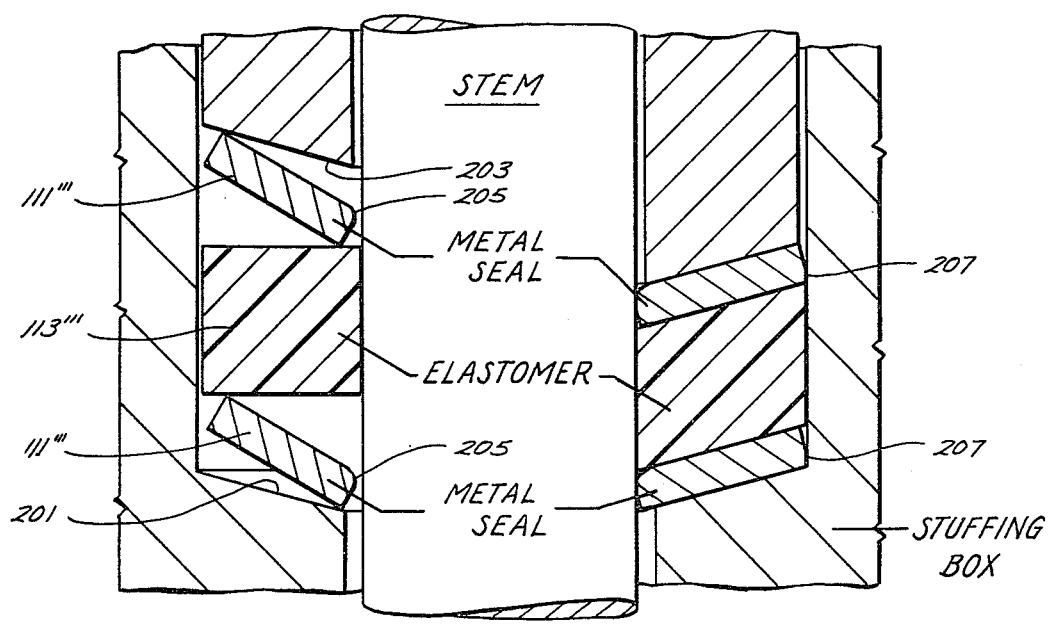

EXTREME TEMPERATURE, HIGH PRESSURE BALANCED, RISING STEM GATE VALVE WITH SUPER PRELOADED, STACKED, SOLID LUBRICATED, METAL-TO-METAL SEAL

CROSS REFERENCES TO RELATED APPLICATIONS

The valve of this invention is of the high pressure, rising stem gate valve type as disclosed in pending United States patent application Ser. No. 512,092 filed Oct. 11, 1974, now U.S. Pat. No. 4,029,294, by McCaskill et al entitled "High Pressure Valve".

The valve construction of the present invention is the same as that disclosed in the above referenced application except for the stem sealing means.

The stem sealing means of the present invention is related to the seals for tubing hangers disclosed in my pending United States patent application Ser. No. 611,860 filed Sept. 10, 1975, now U.S. Pat. No. 4,056,272, entitled "Seal".

The foregoing applications are assigned to the owner of the present application and their disclosures are incorporated herein by reference, including the references to the state of the art.

Applicant claims the priority of his aforementioned pending United States of America application Ser. No. 611,860 filed Sept. 10, 1975, now U.S. Pat. No. 4,056,272, and his prior United States of America application Ser. No. 447,141 filed Mar. 1, 1974, now abandoned, of which Ser. No. 611,860, now U.S. Pat. No. 4,056,272, is a continuation-in-part.

A species of the subject invention was the subject of a proposal or quotation dated June 17, 1975 but is recorded as first offered for sale on June 20, 1975.

BACKGROUND OF THE INVENTION

This invention relates to valves and more particularly to extreme temperature, high pressure, balanced, rising stem gate valves with super preloaded, stacked, solid lubricated metal-to-metal stem seals.

A non-rising stem gate valve with separable seats and automatic plastic sealed gate-seat and seat-body interfaces is disclosed in U.S. Pat. No. 2,433,638—Volpin. A similarly sealed valve of the rising stem, balanced type intended for high pressure use is disclosed in U.S. Pat. Nos. 3,538,938—Volpin, and 3,696,831—Fowler et al. In the latter two patents chevron stem packing compressed by annular screw plugs is employed for the stem seals.

A valve known as a "Graygate" appears to employ plural but separated metal-plastic-metal sandwich seals around the valve stem and in a bonnet pocket but the valve is of the non-rising stem type wherein the problem of an axially moving stem does not exist, the metal rings are not of the dished type, are not coined at their peripheries when in use.

It is believed that the valve of the present invention can be used without leakage in environments of higher pressure and over a wider temperature range than the valves discussed above.

Stacked dished packing rings for a pipe hanger are disclosed in U.S. Pat. No. 2,417,181—Sandilands, but here again there is no relative axial motion of the members being sealed, just a static seal, and the seal does not comprise rings of solid lubricant between dished metal rings that are flattened by the compression means, the latter appearing to be correlative in shape to that of the packing rings.

Difficulties experienced with dished metal-to-metal seal rings of the type disclosed in U.S. Pat. No. 2,992,840 to Reynolds et al are discussed in my aforementioned pending United States patent application Ser. No. 611,860 filed Sept. 10, 1975, now U.S. Pat. No. 4,056,272.

The tubing hanger seals disclosed in Ser. No. 611,860, now U.S. Pat. No. 4,056,272, are of various forms, including frusto conical metal rings flattened to some extent by compression means, but only a static seal is formed, there being no relative motion of hanger and well heat. In one embodiment (sold over a year prior hereto?) the seal is between an inner cylindrical surface and an outer conical surface; there is only one metal ring and no non-metallic ring; and the metal ring is rounded and coined on both its inner and outer peripheries adjacent its convex surface. Other embodiments disclosed in Ser. No. 611,860, now U.S. Pat. No. 4,056,272 application are believed not to have been offered for sale over a year prior hereto and also differ in various respects from the seal of the present application.

SUMMARY OF THE INVENTION

According the invention, a balanced high pressure rising stem gate valve has lubricated metal-to-metal seal means between the bonnet part of the valve body and the valve actuating stem and between the chamber part of the valve body and the balancing stem. Each seal means includes plural, e.g. three dished elastic metal ring gaskets with a high temperature resistant and chemical resistant ring of solid lubricant, e.g. tetrafluorethylene or graphite between each adjacent pair of metal gaskets. Each metal gasket is softer than the stem and is of rectangular cross-section and the edge at the inner periphery on the concave side is rounded. Each seal means is disposed in an annular pocket in the adjacent part of the valve body extending around the stem. Each pocket is closed by an annular plug screwed into the pocket far enough to flatten out the dished metal rings sufficiently for the inner and outer peripheries of each ring to engage the stem and pocket respectively with enough pressure to cause plastic deformation of the inner peripheral edge on the concave side and the outer peripheral edge on the convex side, and to deform the elastic solid lubricant rings into engagement with the stem and pocket, and to prevent movement of the seal relative to the pocket when the valve is in use despite variations in the temperature of the valve and the pressure of the fluid therein and thereabout. The valve stem sealing arrangement may also be employed for packing off lock screws and in other situations wherein relatively movable parts are to be sealed both during and after relative motion.

BRIEF DESCRIPTION OF THE DRAWINGS

For a detailed description of a preferred embodiment of the invention, reference will now be made to the accompanying drawings wherein:

FIGS. 7 and 8 together form an elevation of the actuator stem of the modified form of valve (the balance stem is similar as respects the subject seal means and is not illustrated separately);

FIGS. 11 and 12 are axial sectional views of the compression ring and support ring for the stem seal means (both actuator stem and balance stem seal means) of the modified form of valve;

FIGS. 13 and 14 are plan and side elevational views of an elastic ring of solid lubricant, e.g. "mollyteflon" dimensioned for the modified form of valve shown in FIGS. 3 through 12;

FIGS. 15 and 16 are an axial sectional view and an enlarged fragmentary sectional view taken on the same plane showing a frusto conical metal seal ring dimensioned for the modified form of valve shown in FIGS. 3 through 14; and FIG. 17 is a schematic view depicting the mode of operation of the stem seal means of the invention.

DESCRIPTION OF PREFERRED EMBODIMENTS

Figure 1:
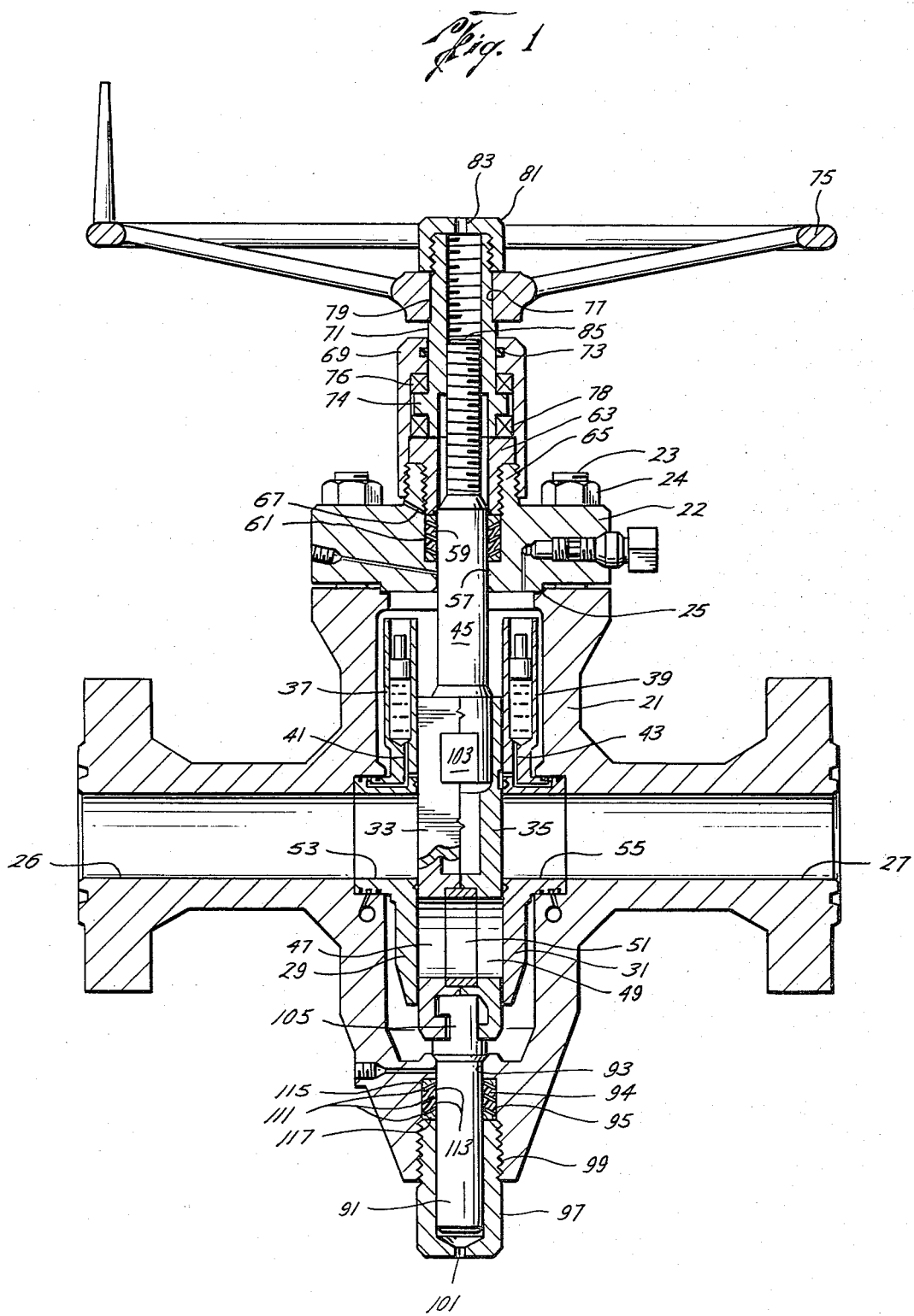
FIG. 1 is a vertical section through a valve embodying the invention.

Referring now to FIG. 1 there is shown a valve including a hollow body having a chamber part 21 and a bonnet part 22 secured thereto by studs 23 and nuts 24; and sealed by suitable sealing means 25. Passages 26, 27 in the chamber part provide a path for fluid flow into and out of the chamber. Seats 29, 31 mounted at the inner ends of passages 26, 27 cooperate with a pair of ported gates 33, 35 which control flow of fluid (e.g. water, oil, gas) through the valve. Plastic sealant material is stored in reservoirs 37, 39, and sealant is automatically supplied through the sealant distribution passages 41, 43 to the gate-seat and seat neck-body interfaces to effect sealing, as described in the above mentioned patents and application. The valve is rated at 25,000 psi working pressure and may be tested at up to 37,500 psi.

The gates are reciprocated by generally cylindrical actuating stem 45 between the closed position shown in FIG. 1 and an open position in which the gate ports 47, 49 and the bridge ring 51 thereacross are in register with the ports 53, 55 in the valve seats. The upper end of the actuating stem extends out of the valve chamber through port 57 in the bonnet. Seal means 59 in accordance with the invention seals between the stem and a cylindrical pocket 61 in the bonnet. Seal means 59 is compressed in pocket 61 by means of screw plug 63 which is screwed into internally threaded neck 65 on the top of the bonnet. Bleed port 67 allows fluid to escape from between the pocket and the plug.

The exterior of bonnet neck 65 is also threaded and receives a bearing cap 69 screwed thereto. Actuator nut 71 screwed onto the threaded upper end of actuator stem 45 has a flange 74 disposed between axial thrust bearings 76, 78; the bearings engaging also the top of plug 63 and the upper end of cap 69. Cap 69 is sealed to the nut 71 by O ring seal 73. Hand wheel 75 has a non-circular aperture 77 fitted over a correlatively shaped portion 79 of the nut 71. The wheel is held in place by retainer nut 81 screwed to the upper end of actuator nut 71. A bleed port 83 allows fluid to escape from between the actuator nut and the upper end 85 of the actuator stem.

To the lower ends of the gates is connected a generally cylindrical balance stem 91 which extends out of the valve chamber through port 93. Seal means 94 in accordance with the invention seals between the balance stem and a cylindrical pocket 95 in the valve body. Seal means 94 is compressed in pocket 95 by means of screw plug 97 which is screwed into threaded socket 99 coaxial with port 93 and pocket 95. A bleed port 101 allows fluid to escape from between the end of the plug 97 and the end of the balance stem.

When hand wheel 75 is turned, actuator nut 71 turns and causes actuator stem 45 to raise or lower the gates 33, 35 to which it is connected by Tee head 103. This in turn causes balance stem 91, connected to the gates by loose fitting head 105, to move up or down. There is thus relative axial motion between each of the stems 45, 91 and the respective one of the stem seal means 59, 94. The seal means must remain tight during such relative motion. Seal means 59, 94 therefore fall in the class of sliding seal means as distinct from the static seal means 25 between the bonnet and chamber parts of the valve body where no relative motion occurs.

Seal means 59, 94 are alike, so only one need be described in further detail. Seal means 94 includes a stack of three frusto conical metal ring gaskets 111 between which are sandwiched elastic solid lubricant rings 113 of lower elastic modulus than the metal ring gaskets, the latter preferably being made of steel as described in the aforementioned patents and application in the bottom of the pocket and adjacent the compression plug 97 are provided base and follower adapter rings 115, 117 which engage flush with and are correlative to the bottom of the pocket and the end of the plug and whose opposite faces are cones having the desired angles for the metal ring gaskets in their final assembled condition. As will be explained in more detail hereinafter, in their relaxed states the metal ring gaskets are more sharply conical, i.e. have smaller cone angles, than in the assembled condition shown in FIG. 1. If desired, one or both of the adapter rings may be omitted, the bottom of the pocket and/or the end of the plug being provided with a conical surface of the desired cone angle and area.

The metal ring gaskets should be made of softer metal than the valve stems in order not to gall the stems. For like reason, the metal gaskets should not be flattened during assembly more than just enough to reduce their inner diameters and expand their outer diameters into moderate coining engagement with the pocket and stem. Also, for the reason, the coined edge of the inner periphery of each metal gasket is rounded, preferably with a radius equal to about half the gasket thickness, e.g. 0.02 inch radius for a gasket that is 0.04 inches thick.

Some examples of materials suitable for the sandwich rings 113 are "Teflon" (tetrafluoroethylene polymer), "Molly-Teflon" (like Teflon but including about 15 percent MoS2 (molybdenum sulfide) and "Grafoil" (compacted graphite.) These materials rub off onto the stem, filling the low places and forming a film overall and lubricating the areas of contact between stem and metal gaskets. It may be noted at this point that it is only the seal between stem and ring gaskets that is a sliding seal, the seal between gaskets and pocket being static.

Since the sandwich rings will be subjected to the temperature and chemical activity of the fluid being controlled by the valve as well as to the ambient temperature and medium in which the valve is to operate, the sandwich material should be resistant to expected chemical action and expected temperature ranges, e.g. 300 degrees Fahrenheit down to ten degrees below zero Fahrenheit or even lower. Materials suitable for a range extending down to 75 degrees below zero Fahrenheit would be desirable.

The sandwich material must be sufficiently elastic to withstand without breaking up the stresses required to flatten the metal gaskets. Preferably the sandwich rings are initially of rectangular configuration, for ease of manufacture, rather than of their final assembled cross-section, so they must deform (preferably elastically but at least plastically) without disintegration sufficiently to allow such change of shape.

Although the coined metal ring gaskets form metal-to-metal seals with the stem and pocket, it will be understood that upon motion of the stem the gasket inner peripheries will not instantaneously and perhaps never further flow plastically to conform to the newly adjacent stem surface and that during the interim the sandwich material may flow into any temporary gaps to prevent leakage. The sandwich material should therefor preferably have the ability to flow elastically, like rubber, into such gaps. An elastomer such as Teflon is therefor the preferred material. If lubrication is deemed less important, a material such as Hycar could be employed. Although elastic material is preferred for the sandwich material, soft plastic metal such as lead might be employed. A composite stack, e.g. of "Molly-Teflon" and "Grafoil" may be used.

It will be noted that in FIG. 1 the metal gasket cones point toward the pressure being sealed against. For a stem seal this may be preferred, although when sealing between parallel surfaces the inner and outer peripheries of the seal are similarly engaged and hence reversible. The inner and outer peripheries of the ring gaskets may be viewed as forming lip seals adapted respectively to seal against pressure directed against the convex and concave faces of the gaskets. By pointing the cones toward and pressure, the inner peripheries of the cones become effective as lip seals, and it is at the inner peripheries where a sliding seal must be formed.

The sandwich rings 113 should make an interference fit with the stem e.g. several thousandths of an inch diametral interference. The pocket and stem need employ only ordinary smooth machine finishes comparable with those ordinarily used for elastomer packings.

Although it is preferred to use a stack of three metal gaskets with two elastic lubricant rings sandwiched therebetween (triple decker) in order to provide back up, a pair of metal gaskets (as shown in the modification described hereinafter) works well. If an open sandwich, i.e. one metal gasket and one elastomer lubricant ring is employed disposed on the fluid pressure side of the metal gasket, a seal can be effected but the elastomer tends to flow into the crack between the stem and the port in the bonnet or chamber part of the body, necessitating tightening of the compression plug at intervals. Use of plural gasket rings wholly enclosing the sandwich rings prevents such extrusion since there is zero gap between the metal ring gaskets and the stem and pocket.

In order to prevent leakage despite cycles of high and low pressure the compression plugs are tightened to preload the seals to a stress higher than the highest expected fluid pressure will cause. Since in the case of a quick temperature change, e.g. the sun coming out in the artic or in the desert, the metal expands faster than the elastomer, the preload should be even greater than that required to equal the stress of the pressure fluid, e.g. twice that stress, in order to prevent relative movement of the gasket rings, sandwich rings, and the pocket and stem. Such a high preload may be called a super preload. Typical makeup is with a torque of 600 to 900 pound-feet on the compression plugs, hereinafter depicted in more detail.

The tolerance for the diameters of the stem and gaskets and pocket may be plus or minus 0.005 inch.

The ring gaskets are not Belleville springs, which would be too hard and would gall the stems. Rather they are, e.g., annealed (austenitic) stainless steel. They must be able to coin without imprint on the stem (which may be only 30 Rockwell hardness).

The adapter rings 115, 117, if used, may be of fairly hard material such as 4140 steel, but should make a close fit with the pocket to insure non-contact with the stem upon turning of the compression plug.

The stem material may, for example be K-Monel, but a comparable steel would be suitable.

The body (chamber part and bonnet part) may be made of any steel conventionally used for high pressure valves.

Figure 2:
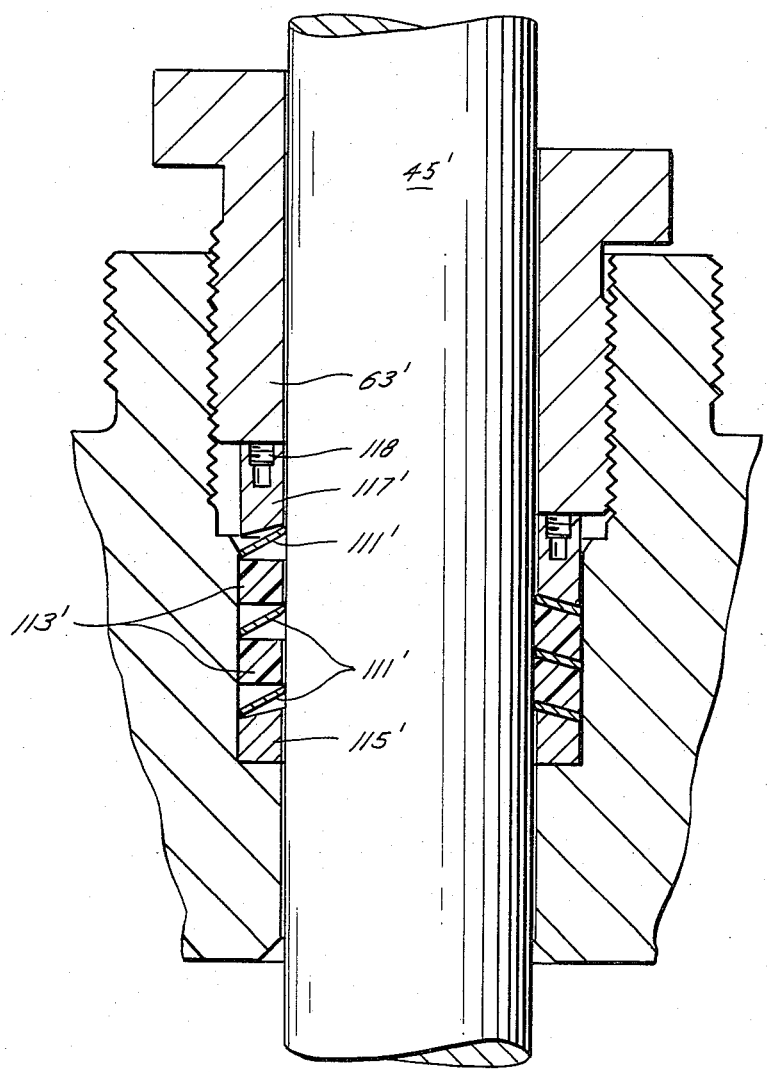
FIG. 2 is a fragmentary sectional schematic view taken in the same plane as FIG. 1 but to a larger scale and showing a modified form of the actuator stem seal means in which the stack of frusto conical metal seal rings point away from the pressure inside the valve.

Referring now to FIG. 2, there is shown a schematic view of a reverse pointing triple gasket actuator stem seal, the half of the drawing at the left depicting the seal in unloaded condition, the half of the drawing at the right showing the seal as it appears when loaded. Parts similar to the parts of FIG. 1 are given like numbers but primed. The follower ring 117' is provided with sockets 118 to facilitate removal.

Figure 3:
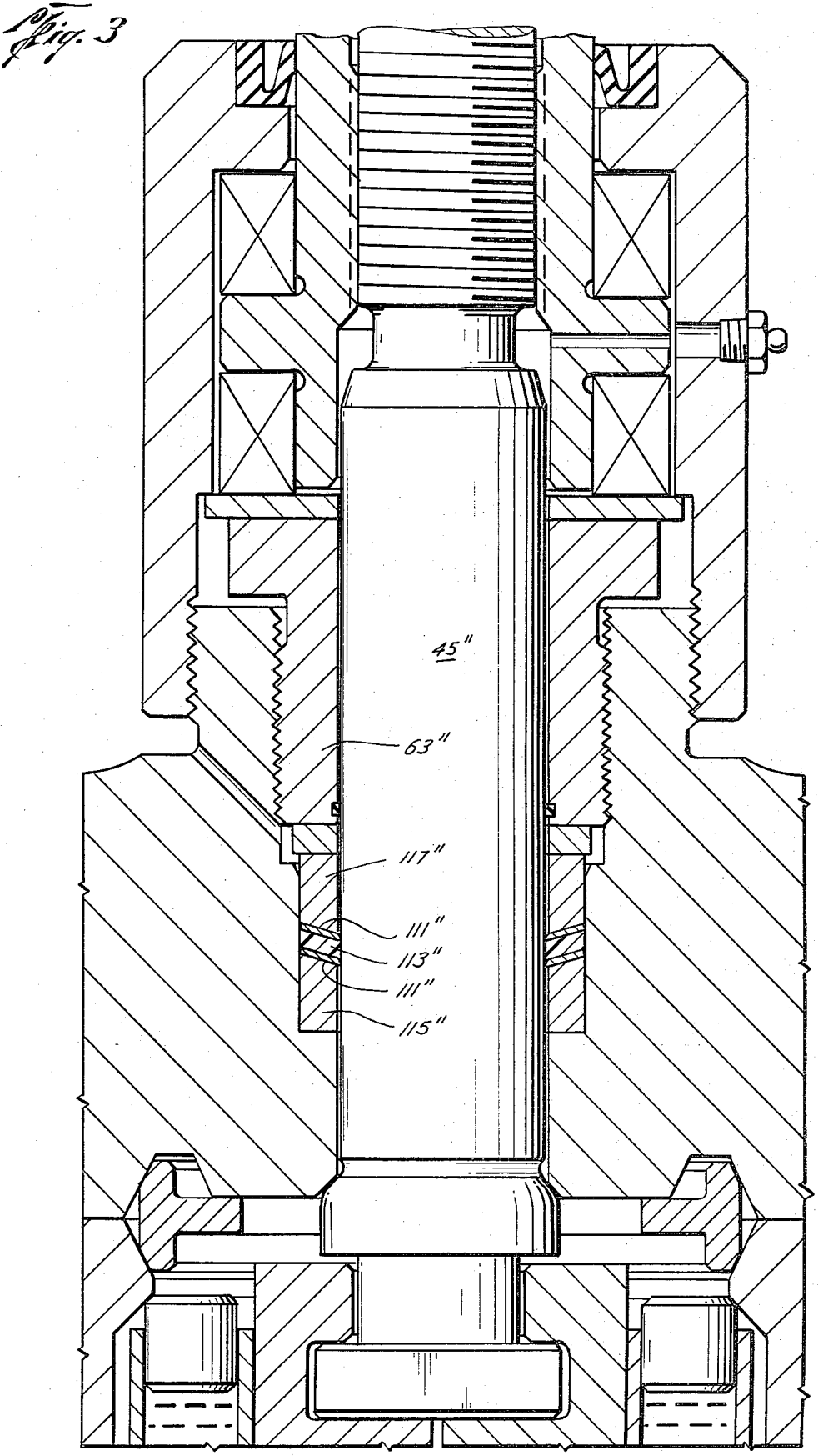
FIG. 3 is a fragmentary vertical sectional view through the actuator stem seal means of a modified form of valve in which the stem seal means employs only two frusto conical metal seal rings.
Figure 4:
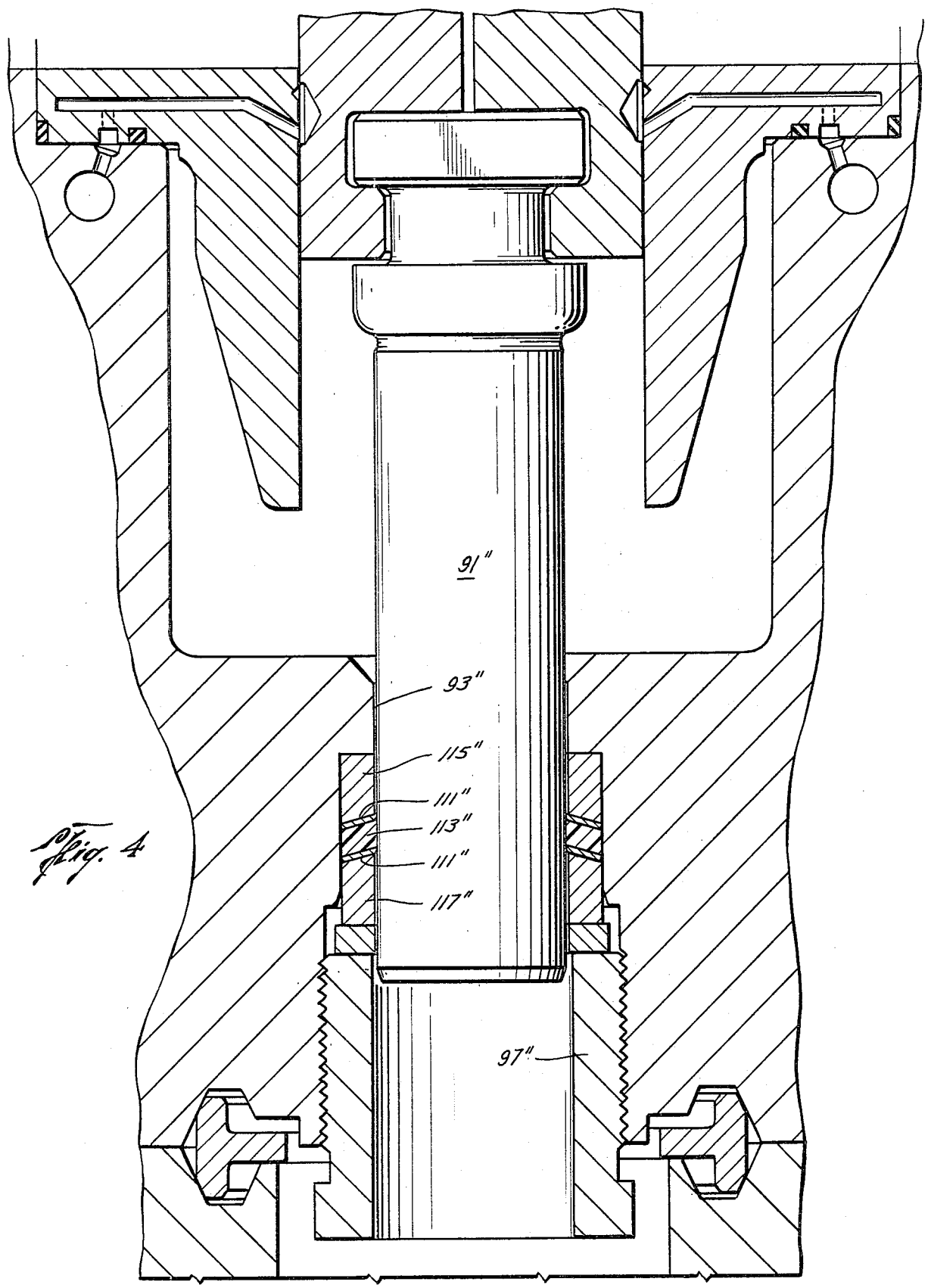
FIG. 4 is a view similar to FIG. 3 except showing the balance stem seal means of the modified form of valve.
Figure 5:
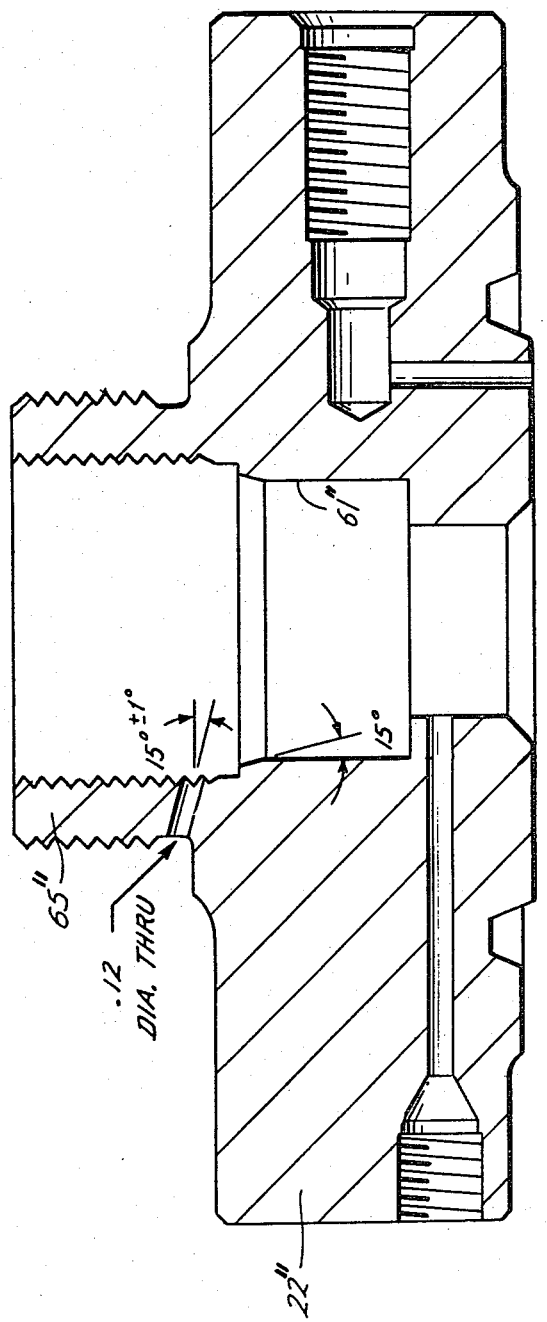
FIGS. 5 and 6 are fragmentary sectional views of the modified form of valve but to a larger scale and showing the pockets of the seal means for the actuating stem and balance stem respectively.
Figure 6:
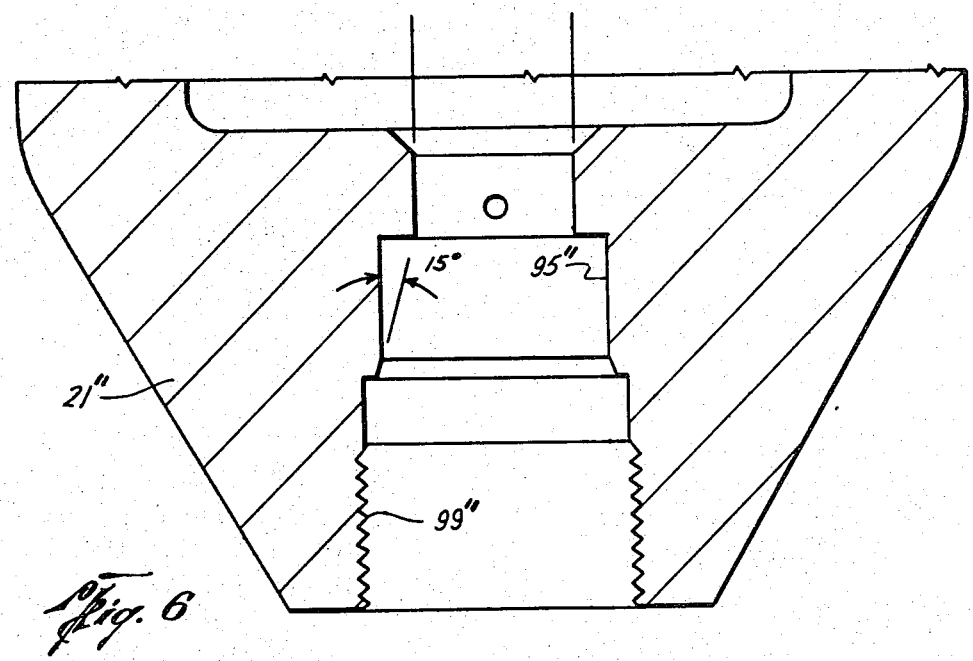
Figure 9:
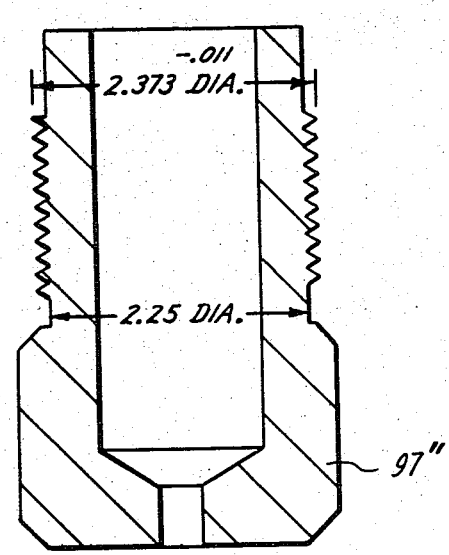
FIGS. 9 and 10 are an axial sectional view and an end view of the seal compression plug for the balance stem seal means.
Figure 10:
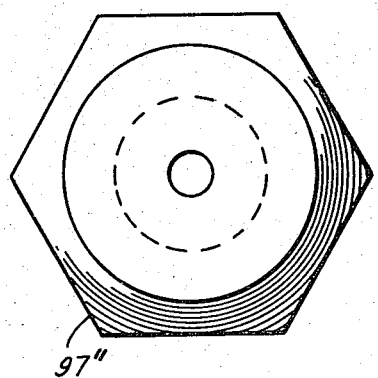

Referring to FIGS. 3 and 4, there is shown the stem seal constructions of a modified form of valve wherein but two metal gasket rings and one sandwich ring are employed for each stem seal. These are numbered the same as in FIG. 1 except double primed.

FIGS. 5–16 show typical materials finishes, tolerances and dimensions for the pockets, stems, seal compression plugs, adapter rings, sandwich rings, and metal ring gaskets for the stem seal means of the valve of FIGS. 3 and 4.

FIG. 17 is a schematic view of a stem seal means employing only two metal ring gaskets 111''' and one sandwich ring 113''', without any adapter rings, the faces 201, 203 of the pocket and compression plug being formed with cone angles the same as desired for the ring gaskets when assembled and loaded. The rounded edges 205 on the inner edges of the metal rings on their concave sides appear clearly in this figure at the left hand side depicting the unloaded condition of the seal means. The change in shape of the sandwich ring and the metal rings to conform to the conical faces of the pocket and plug is illustrated by comparing the left hand side of the figure with the right hand side which illustrates the loaded condition of the seal means. Note also that the metal rings do not engage the stem or sides of the pocket prior to loading and that the outer periphery of the sandwich ring is initially smaller than the pocket inner diameter, but the sandwich makes a tight (interference) fit with the stem even before loading, e.g. several thousandths of an inch diametral interference. FIG. 17 also illustrates the coining (plastic metal flow) which takes place on both the inner and outer peripheries of the metal ring gaskets, i.e. not only at 205 but also at 207.

While preferred embodiments of the invention have been shown and described, many modifications thereof can be made by one skilled in the art without departing from the spirit of the invention. For example seal means employing a stack of more than three metal gaskets with interposed sandwich rings could be used. Auxiliary hydraulic loading means can be provided for further coining the metal ring gaskets without further turning of the screw plugs.

What is claimed as invention is:

1. A Valve including a hollow body having a flow path therethrough, balanced rising stem gate means in the body reciprocal to control fluid flow through the body and including actuator and balance stems extending through ports in the body from the inside thereof, there being an annular pocket having a wall in the body around each stem, each of said walls being substantially parallel to the corresponding one of said stems, seal means in each pocket, and plug means engageable with each seal means for compressing said seal means, each seal means including at least one dished metal ring gasket and one sandwich ring adjacent thereto made of a more compliant material, each of said dished metal ring gaskets being deformed at its peripheral edges into metal-to-metal sealing engagement with the corresponding one of said stems and said walls upon compression of said seal means by said plug means.

2. Valve according to claim 1 in which the sandwich ring is made of lubricating material.

3. Valve according to claim 2 in which the sandwich ring is an elastomer.

4. Valve according to claim 3 in which the sandwich ring is made of "Teflon".

5. Valve according to claim 4 in which the sandwich ring material includes up to 15 percent of molybdenum sulfide.

6. Valve according to claim 5 including a second sandwich ring made of "Grafoil".

7. Valve according to claim 3 in which the sandwich ring has an unloaded diametral interference with the stem of several thousandths of an inch, e.g. 2 or more.

8. Valve according to claim 3 in which the sandwich ring is initially of a different cross section from its cross section when the seal means is compressed.

9. Valve according to claim 8 in which the sandwich ring is initially of rectangular cross section.

10. Valve according to claim 9 in which the sandwich ring when loaded is of parallelogram diamond cross section with internal angles different from 90 degrees.

11. Valve according to claim 1 in which the metal ring gasket is of rectangular cross section and rounded at the inner peripheral edge on the concave side.

12. Valve according to claim 1 in which the metal ring gasket is compressed to be partially flattened out and its inner and outer peripheries are coined where they engage the stem and pocket.

13. Valve according to claim 12 wherein the stem and pocket side are cylindrical surfaces.

14. Valve according to claim 1 in which the metal ring gaskets are frusto-conical and the adjacent faces of the plug and pocket bottom are provided with surface means for engaging said seal means of conical configuration but having greater cone angles than said metal ring gaskets.

15. Valve according to claim 14 wherein at least one of said surface means is integral with one of said adjacent faces of the plug means and pocket bottom.

16. Valve according to claim 14 wherein at least one of said surface means is provided by an adapter ring.

17. Valve according to claim 14 wherein both of said surface means are provided by adapter rings.

18. Valve according to claim 1, each seal means including a second metal ring gasket with the sandwich ring disposed between the gaskets.

19. Valve according to claim 18 in which both gaskets are dished in the same direction.

20. Valve according to claim 19, each seal means including a third gasket dished in the same direction and a second sandwich ring between the second and third gaskets.

21. Valve according to claim 20 in which said gaskets are dished toward the valve pressure to be sealed against.

22. Valve according to claim 21 in which the seal means is super preloaded.

23. A sealing system for a high pressure valve including a valve body having inlet and outlet conduits and upper and lower apertures with a chamber therebetween, a bonnet closing the upper aperture, a cap closing the lower aperture, an upper stem and a lower stem mounted within the valve body and having a gate disposed therebetween, a gate seat disposed within the chamber and housing the gate, the upper stem extending into the bonnet, the lower stem extending into the cap, and the valve having an open position where the gate permits flow through the conduits and a closed position where the gate blocks flow through the conduits, the improvements comprising:

first dual seal means providing at least two separate means for providing metal-to-metal sealing engagement between the upper stem and the bonnet, one of said separate means of said first dual seal means including at least one dished metal ring gasket deformed at its peripheral edges into such metal-to-metal sealing engagement with both the upper stem and bonnet;

second dual means providing at least two separate means for providing metal-to-metal sealing engagement between the lower stem and the valve body, one of said separate means of said second dual means including at least one dished metal ring gasket deformed at its peripheral edges into such metal-to-metal sealing engagement with both the lower stem and valve body.

24. A sealing system for a high pressure gate valve including a valve body having inlet and outlet conduits with a chamber therebetween, an upper stem reciprocably disposed in a bonnet mounted on the valve body, a gate mounted below and attached to the upper stem and reciprocably disposed in a gate seat mounted within the chamber and a reciprocating apparatus for moving the gate between a closed position where flow is blocked through the conduits and an open position where flow is permitted through the conduits, the improvement comprising:

first seal means for providing a metal-to-metal sealing engagement between the upper stem and the bonnet, said first seal means including at least one dished metal ring gasket deformed at its peripheral edges into such metal-to-metal sealing engagement with both the upper stem and bonnet;

and second seal means for providing a metal-to-metal sealing engagement between the upper stem and the bonnet in the open position, said second seal means including an annular enlargement portion on said upper stem engageable with an annular seat in said bonnet when such valve is in such open position.

25. A valve including a hollow body having a flow path therethrough and a port therethrough, rising stem gate means in the body reciprocable to control fluid flow through the body and including an actuator and a stem extending through the port in the body from the inside thereof, there being an annular pocket in the body around the stem, the pocket having a wall, said wall being substantially parallel to said stem, seal means in the pocket, and a packing gland engageable with the seal means for compressing the seal means, the seal means including at least one dished metal ring gasket and one sandwich ring adjacent thereto made of a more compliant material than the metal ring gasket, said dished metal ring gasket being deformed at its peripheral edges into metal-to-metal sealing engagement with said stem and said wall upon compression of said seal means by said packing gland.

26. A valve including a hollow body having a flow path therethrough and a port, stem gate means in the body for controlling fluid flow through the body and including a stem extending through the port in the body from the inside thereof, there being an annular pocket in the body around the stem, seal means in the pocket for preventing fluid from flowing from the body through the annular pocket, and compression means engageable with the seal means for compressing the seal means, the seal means including metal ring gaskets and means for urging each of the metal ring gaskets into metal-to-metal sealing engagement with both the stem and the pocket upon compression of the seal means by the compression means, each of said metal ring gaskets being deformed at its peripheral edges where such metal-to-metal sealing engagement is effected.

27. A subassembly of a seal system, the seal system used to prevent a flow of fluid along the wall of a moving stem and along a fixed wall closely positioned to the moving stem and parallel thereto, comprising
a non-extrudable seal ring juxtaposed to and in sealing engagement with both the wall of the moving stem and the fixed wall for preventing such flow of fluid said non-extrudable seal ring being deformed at its peripheral edges into metal-to-metal sealing engagement with said fixed wall and said stem wall;
an extrudable seal ring;
said non-extrudable seal ring being positioned to prevent said extrudable seal ring from extruding under pressure between said non-extrudable seal ring and the wall of the moving stem and between said non-extrudable seal ring and the fixed wall.

28. A seal system between a fixed wall and a wall of a moving component, such walls being substantially parallel to each other, for preventing fluid flow from the fluid side of the seal to the atmospheric side of the seal, comprising:
a sandwich ring;
a metal ring gasket disposed between such fixed wall and such wall of such moving component;
compression means for compressing said sandwich ring and said metal ring gasket and for deforming said metal ring gasket at its peripheral edges into metal-to-metal sealing engagement with both of such walls.

* * * * *

UNITED STATES PATENT AND TRADEMARK OFFICE
CERTIFICATE OF CORRECTION

PATENT NO. : 4,363,465
DATED : December 14, 1982
INVENTOR(S) : Charles D. Morrill It is certified that error appears in the above—identified patent and that said Letters Patent is hereby corrected as shown below:

In the abstract, line 8; after "lubricant," insert
--e.g.--.

Column 4, line 37; change "application in the" to
--application. In the --.

Column 4, line 57; before "reason," delete "the" and
substitute therefor --like--.

Column 5, line 46; delete "and" and substitute
therefor --the--.

Signed and Sealed this

Eighth Day of March 1983

[SEAL]

Attest:

GERALD J. MOSSINGHOFF

Attesting Officer  Commissioner of Patents and Trademarks